United States Patent
Ungar et al.

(10) Patent No.: US 7,172,743 B2
(45) Date of Patent: Feb. 6, 2007

(54) METHOD FOR THE CATALYTIC PRODUCTION OF AMMONIA FROM SYNTHESIS GAS

(76) Inventors: Gert Ungar, Grosser Hasenpfad 117, 60598 Frankfurt am Main (DE); Jürg Dieter Ungar, Grosser Hasenpfad 117, 60598 Frankfurt am Main (DE); Sybille Ungar, Sonnenwiechserstr. 24a, 83052 Bruckmuhl (DE)

( * ) Notice: Subject to any disclaimer, the term of this patent is extended or adjusted under 35 U.S.C. 154(b) by 312 days.

(21) Appl. No.: 10/473,315

(22) PCT Filed: Feb. 15, 2002

(86) PCT No.: PCT/EP02/01609

§ 371 (c)(1),
(2), (4) Date: Mar. 9, 2004

(87) PCT Pub. No.: WO02/079088

PCT Pub. Date: Oct. 10, 2002

(65) Prior Publication Data

US 2004/0146446 A1 Jul. 29, 2004

(30) Foreign Application Priority Data

Mar. 31, 2001 (DE) .................. 101 16 150

(51) Int. Cl.
*C01C 1/04* (2006.01)
(52) U.S. Cl. ....................... 423/360; 423/361
(58) Field of Classification Search ................ 423/360, 423/361
See application file for complete search history.

(56) References Cited

U.S. PATENT DOCUMENTS

| 1,931,678 | A | * | 10/1933 | Porter ........................ 423/361 |
| 2,046,478 | A | * | 7/1936 | O'Leary ..................... 423/361 |
| 4,230,680 | A | * | 10/1980 | Becker et al. .............. 423/360 |
| 4,510,123 | A | * | 4/1985 | Grotz ......................... 423/360 |
| 4,624,842 | A | * | 11/1986 | Grotz, Jr. ................... 423/360 |

(Continued)

FOREIGN PATENT DOCUMENTS

DE 938 546 C 2/1956

(Continued)

*Primary Examiner*—Wayne A. Langel
(74) *Attorney, Agent, or Firm*—Norris McLaughlin & Marcus PA

(57) ABSTRACT

Ammonia is produced from a synthesis gas containing nitrogen and hydrogen on a granular catalyst in at least one reactor at pressures in the range from 50 to 300 bar and temperatures in the range from 100 to 600° C. A product mixture containing $NH_3$ vapor is withdrawn from the reactor, is cooled, and ammonia is condensed and separated. There is obtained a recycle gas to which fresh synthesis gas is admixed, the recycle gas being recirculated to the reactor as synthesis gas. Unreacted synthesis gas is passed through a first catalyst bed free of cooling tubes and subsequently as partly reacted synthesis gas with an $NH_3$ content of 5 to 20 vol-% as heating fluid through a heat exchanger. Partly reacted synthesis gas is passed through at least one further catalyst bed, through which extend cooling tubes. Unreacted synthesis gas is passed as cooling gas through the cooling tubes of the further catalyst bed, and cooling gas heated to 300 to 500° C. is introduced into the first catalyst bed. Unreacted synthesis gas flows through the cooling tubes and the further catalyst bed in a cocurrent flow.

7 Claims, 2 Drawing Sheets

U.S. PATENT DOCUMENTS

Figure 1:
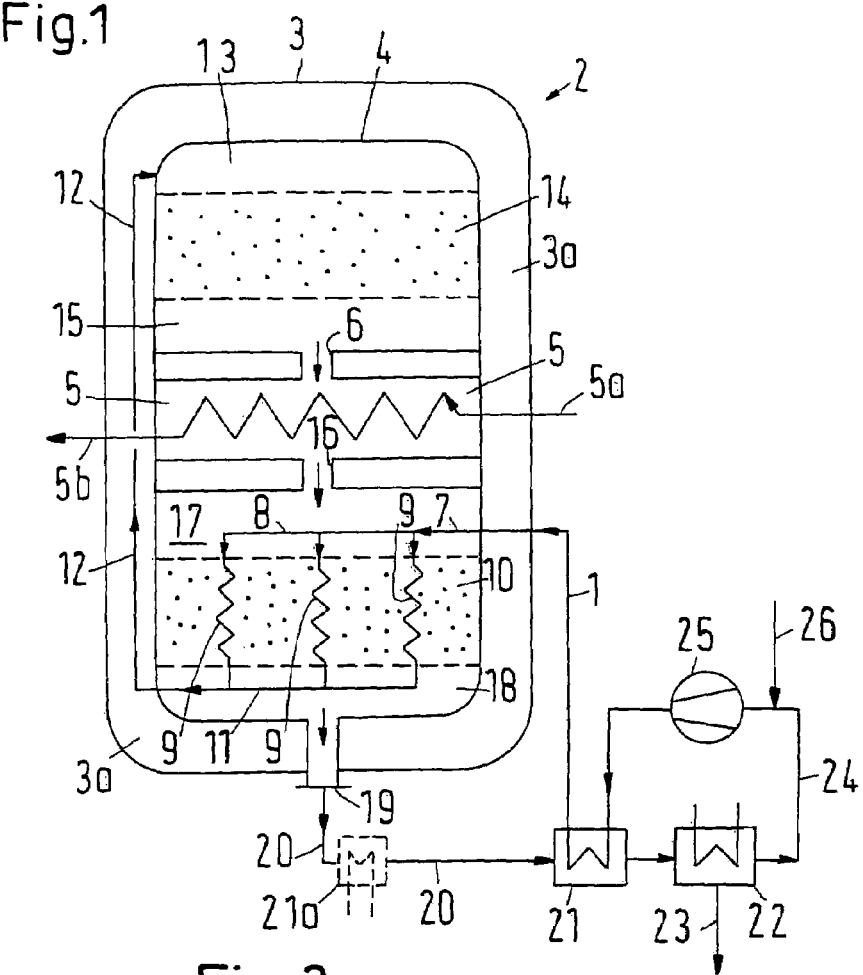

| | | | | |
|---|---|---|---|---|
| 4,744,966 A | * | 5/1988 | Grotz | 423/360 |
| 4,867,959 A | * | 9/1989 | Grotz | 423/360 |
| 5,032,364 A | * | 7/1991 | Pinto | 422/148 |
| 5,997,834 A | * | 12/1999 | Udengaard et al. | 423/361 |

FOREIGN PATENT DOCUMENTS

| | | | | |
|---|---|---|---|---|
| DE | 12 17 934 B | | 6/1966 | |
| DE | 14 42 643 A | | 11/1968 | |
| DE | 15 42 293 A | | 3/1970 | |
| EP | 303032 | * | 2/1989 | 423/361 |
| GB | 1 425 271 A | | 2/1976 | |
| GB | 2109361 | * | 6/1983 | 423/360 |
| WO | WO 86 06058 A | | 10/1986 | |
| WO | WO 92/05112 | * | 4/1992 | 423/361 |

* cited by examiner

METHOD FOR THE CATALYTIC PRODUCTION OF AMMONIA FROM SYNTHESIS GAS

This application is a 371 of PCT/EP02/01609, filed Feb. 15, 2002.

This invention relates to a process of producing ammonia from a synthesis gas containing nitrogen and hydrogen on a granular catalyst in at least one reactor at pressures in the range from 50 to 300 bar and temperatures in the range from 100 to 600° C., wherein a product mixture containing $NH_3$ vapor is withdrawn from the reactor, is cooled, and ammonia is condensed and separated, wherein a recycle gas is obtained, to which fresh synthesis gas is admixed, and wherein the recycle gas is recirculated to the reactor as synthesis gas.

It is the object underlying the invention that when the synthesis gas flows through a plurality of catalyst beds the temperatures should be controlled such that the product mixture has a rather high $NH_3$ concentration. In accordance with the invention, this is achieved in that unreacted synthesis gas, which has served as cooling gas, is passed through a first catalyst bed free of cooling tubes and subsequently as partly reacted synthesis gas with an $NH_3$ content of 5 to 20 vol-% as heating fluid through a heat exchanger, that partly reacted synthesis gas is passed through at least one further catalyst bed through which extend cooling tubes, that unreacted synthesis gas is passed as cooling gas through the cooling tubes of the further catalyst bed, and cooling gas heated to 300 to 500° C. is introduced into the first catalyst bed, and that the unreacted synthesis gas flows through the cooling tubes and the further catalyst bed in a cocurrent flow.

In this process it is important that the unreacted synthesis gas first of all flows through a first catalyst bed free of cooling tubes, the formation of $NH_3$ starting intensively and leading to an increase in temperature around usually 80 to 200° C. In the heat exchanger, the partly reacted synthesis gas is cooled again, where the temperature decrease can be regulated. Usually, the temperature in this heat exchanger decreases by 50 to 150° C. In the further catalyst bed, which has cooling tubes, the reaction is then continued in a controlled manner until the desired product mixture is obtained. The number of the further catalyst beds, which are equipped with cooling tubes, mostly lies in the range from 1 to 4 beds. In each of these cooled beds, the number of the cooling tubes and thus the cooling intensity can be chosen as desired. To the heat exchanger, liquid, gaseous or vaporous cooling medium can be supplied, e.g. evaporating water or also unreacted synthesis gas. The partly reacted synthesis gas is usually cooled in the heat exchanger by 30 to 180° C. With the inventive process it is possible to reach a temperature profile in the cooled catalyst beds, which comes closest to the optimum temperature curve. As a result, very high $NH_3$ concentrations are achieved in the product gas mixture.

One variant of the inventive process consists in that the heating fluid coming from the heat exchanger is discharged from the reactor and introduced into a separate tubular reactor, in which the catalyst is arranged in tubes which are cooled indirectly by a circulating cooling fluid. From the tubular reactor, partly reacted synthesis gas with an $NH_3$ content of 15 to 30 vol-% and temperatures of 250 to 500° C. is withdrawn and subsequently passed through one or more catalyst beds with cooling tubes. Usually, the pressure on the outside of the catalyst-containing tubes of the tubular reactor will be lower than inside the tubes by 30 to 290 bar. Expediently, partly reacted synthesis gas with an $NH_3$ content of 5 to 15 vol-% is introduced into the separate tubular reactor, so that an essential part of the reaction can take place in this separate tubular reactor.

An advantageous aspect of the process consists in that partly reacted synthesis gas is passed through at least two further catalyst beds, which are equipped with cooling tubes. The product mixture withdrawn from the last one of these catalyst beds leaves the reactor and is cooled outside for condensing the ammonia. Expediently, the cooling gas coming from the heat exchanger is first passed through the cooling tubes of the last catalyst bed and subsequently through the cooling tubes of the penultimate catalyst bed. In this case, it is recommended to use unreacted synthesis gas as cooling medium in the heat exchanger, which unreacted synthesis gas is subsequently supplied to the cooling tubes of a catalyst bed.

The production of the synthesis gas, which contains hydrogen and nitrogen in a molar ratio of about 3:1, is known and described for instance in EP patent 307 983. The catalysts to be used are commercially available and contain e.g. Fe and oxides of K, Ca, Al (such as the catalyst FNMS of Montecatini-Edison) as active components.

Figure 3:
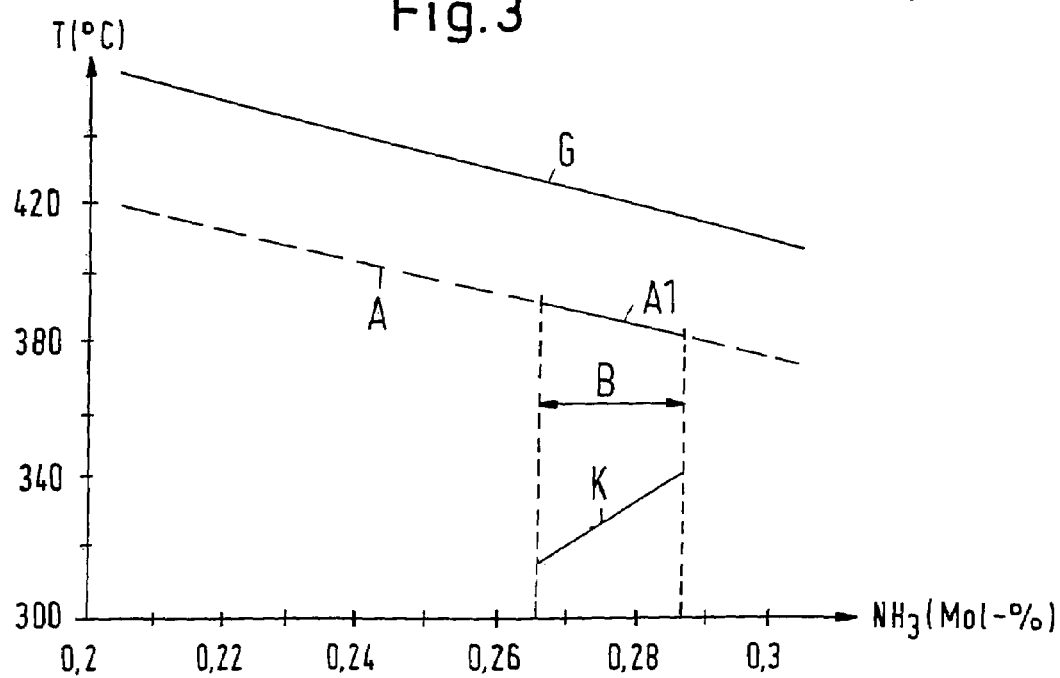
Figure 2:
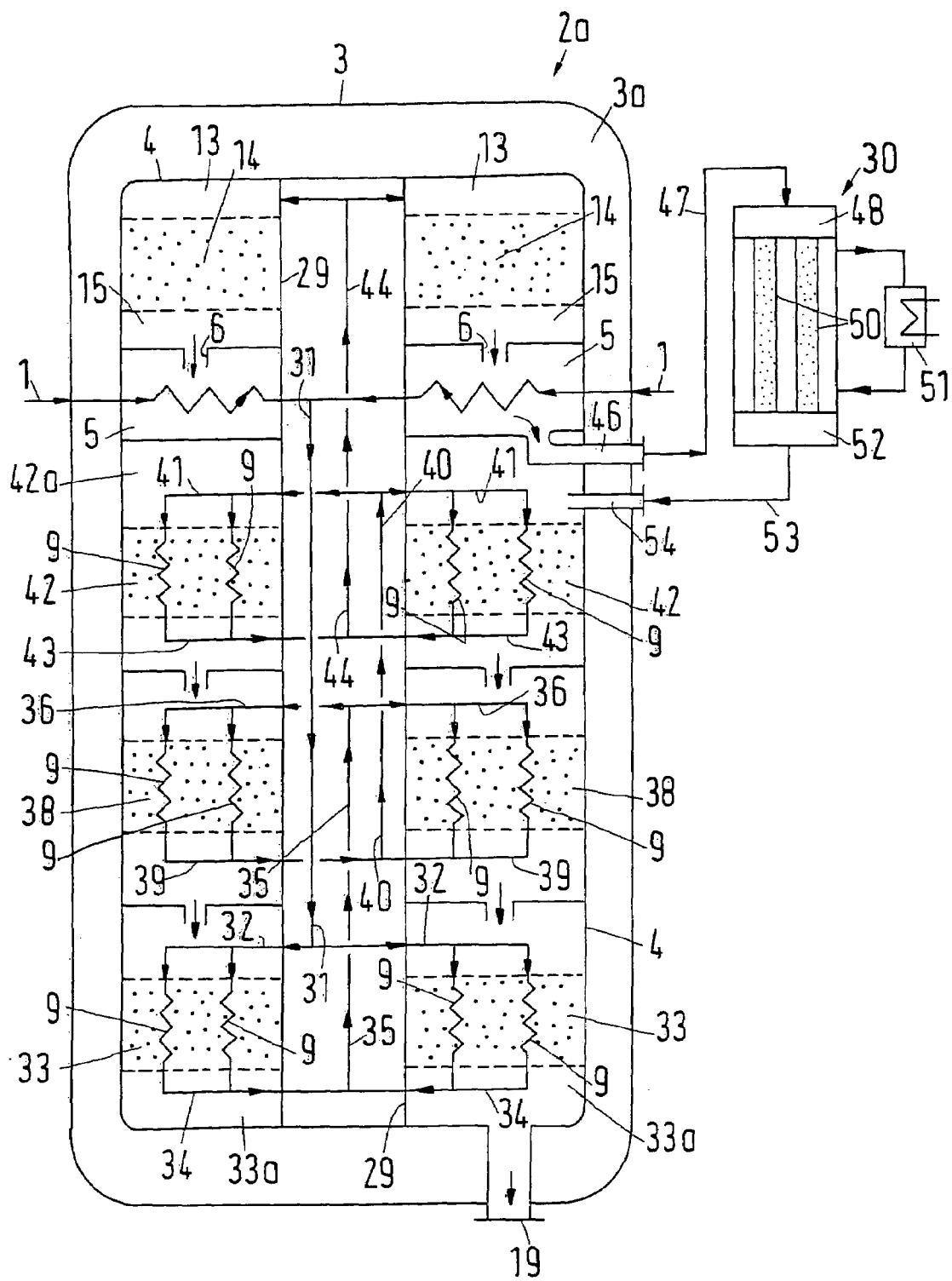

Embodiments of the process will be explained with reference to the drawing, in which:

FIG. 1 shows schematic representation of a first variant of a synthesis reactor in a longitudinal section, FIG. 2 shows a longitudinal section of a reactor for a second process variant, and FIG. 3 shows a diagram of the optimum course of the reaction.

In the process of FIG. 1, the circulating synthesis gas flows through line (1) into the reactor (2), which has an outer shell (3) and an inner shell (4). The synthesis gas first of all flows through line (7) to a distributor (8), which communicates with cooling tubes (9). The cooling tubes (9) are disposed in a catalyst bed (10) and at their outlet ends are connected with a collector (11), through which heated synthesis gas flows to a line (12) and then into the distribution space (13) of a first catalyst bed (14). The tubes (9) may be bent, coiled or also straight.

The unreacted synthesis gas flows from the distribution chamber (13) into the first catalyst bed (14), where the formation of $NH_3$ starts intensively. In the outlet chamber (15) belonging to the first catalyst bed (14) partly reacted synthesis gas with an $NH_3$ content of 5 to 20 vol-% accumulates and flows through the wall opening (6) into the heat exchanger (5), which is free of catalyst. There, the partly reacted synthesis gas is cooled indirectly, cooling medium is supplied via line (5a) and is discharged via line (5b). Through a further wall opening (16), the cooled, partly reacted synthesis gas then gets into a distribution chamber (17) which belongs to the cooled catalyst bed (10). In this catalyst bed, the reaction is continued and a product mixture is obtained, which first of all accumulates in the outlet chamber (18) and then leaves the reactor (2) through the outlet (19).

The product mixture flows through line (20) to an indirect cooler (21), before which a cooler (21a) indicated in broken lines may be provided, and is then subjected to a further multi-stage cooling in a manner known per se, where $NH_3$ is condensed. The drawing shows a simplified representation of the heat exchanger (22), from which condensed ammonia is withdrawn through line (23). Remaining recycle gas flows through line (24) to a compressor (25), fresh synthesis gas being admixed through line (26). The recycle gas is heated in the cooler (21) and recirculated to the reactor (2) through line (1).

It is possible and known per se to first of all introduce unreacted synthesis gas and e.g. recycle gas from line (1) into the space (3a) between outer shell (3) and inner shell (4), so as to have a cooling effect and protect the shells against being overheated. This unreacted synthesis gas is then e.g. first of all introduced into the cooling tubes (9) of the cooled catalyst bed (10), where it acts as cooling gas. For the process variant of FIG. 2 the reactor (2a) is provided, with which a separate tubular reactor (30) is connected. The circulating synthesis gas enters through lines (1) first into the heat exchanger (5) and absorbs heat from partly reacted synthesis gas, which enters the heat exchanger (5) through the wall openings (6). The partly heated cooling gas leaves the heat exchanger (5) through line (31) and reaches a distributor (32) whose cooling tubes (9) are arranged in the last catalyst bed (33). Line (31) is disposed in a vertical, central tube (29), whose inner region is free of catalyst.

The cooling tubes (9) of the last catalyst bed (33) open into a collector (34) which is connected with a discharge line (35) which leads to a distributor (36). The cooling tubes (9) connected with the distributor (36) are located in a further catalyst bed (38), and the cooling gas flows from the tubes (9) to a further collector (39) and then through a discharge line (40) to a third distributor (41), which belongs to a further catalyst bed (42). The cooling tubes (9) proceeding from the distributor (41) open into a collector (43) which is connected with the discharge line (44) which supplies the heated, unreacted synthesis gas to the distribution chamber (13) of the first catalyst bed (14). This first catalyst bed (14) is free of cooling tubes. Partly reacted synthesis gas first of all gets into the collecting chamber (15) and is then cooled in the gas-gas heat exchanger (5). From here, the partly reacted synthesis gas, which has an $NH_3$ content of 5 to 15 vol-%, first of all flows through the outlet (46) and then through line (47) to the separate tubular reactor (30), in which the granular catalyst is disposed in tubes (50). From a distribution chamber (48), the partly reacted synthesis gas flows into these tubes (50), which are surrounded by a cooling medium. The cooling medium is circulated through an outer cooler (51) in a manner known per se. The cooling medium may for instance be diphenyl or also molten salt.

Synthesis gas with an $NH_3$ content of 15 to 30 vol-% and temperatures of 250 to 500° C. leaves the tubes (50) filled with catalyst, first of all gets into a collecting chamber (52) and then flows through line (53) to an inlet port (54) and then into the distribution chamber (42a), which belongs to the catalyst bed (42).

For the further reaction, the partly reacted synthesis gas flows downwards in the drawing, first through the cooled catalyst bed (42), then through the likewise cooled catalyst bed (38) and finally through the cooled catalyst bed (33) to an outlet chamber (33a) and then as product mixture to the reactor outlet (19). The further treatment of the product mixture, in particular its cooling, the separation of $NH_3$, the supply of fresh synthesis gas and the recirculation to line (1) each is the same as described in conjunction with FIG. 1.

In the process of FIG. 2, it is an essential aspect that the cooling gas of relatively low temperature, which flows in the cooling tubes (9), is utilized for cooling in the last catalyst bed (33), before it is subsequently passed as cooling gas through the penultimate catalyst bed (38).

FIG. 3 shows a diagram of the connection between reaction temperature T and $NH_3$ content (in mol-%) in the synthesis gas. Line (G) indicates the state of equilibrium, line (A) the optimum temperature for the reaction rate. Section B includes the mode of operation of the bed (38) belonging to the subsequent example, the temperature profile is indicated by line (A1), and (K) is the associated coolant temperature. In the example, the temperatures in the tubular reactor (30) and also as in the beds (42) and (33) approximately lie on the optimum temperature curve.

EXAMPLE

The example refers to a procedure in accordance with FIG. 2, where ammonia is produced in an amount of 1000 t per day. Since the synthesis gas comes from a wash with liquid nitrogen, it virtually contains neither $CH_4$ nor argon.

The data for flow rates, pressures, temperatures and compositions, which are calculated in part, can be taken from the following table. The catalyst is of the above-mentioned type FNMS.

|  | Reference numeral | | | | | | | |
| --- | --- | --- | --- | --- | --- | --- | --- | --- |
|  | 1 | 44 | 6 | 47 | 53 | 42 | 38 | 19 |
| Temperature (° C.) | 241 | 358 | 506 | 450 | 395 | 387 | 379 | 19373 |
| Pressure (bar) | 145 | 143 | 142.9 | 142.4 | 141.9 | 140.8 | 140 | 139.6 |
| Flow rate (kmol/h) | 11578 | 11578 | 10624 | 10624 | 9472 | 9343 | 9232 | 9132 |
| Composition | | | | | | | | |
| $N_2$ (vol-%) | 24.5 | 24.5 | 22.2 | 22.2 | 18.8 | 18.4 | 18.0 | 17.6 |
| $H_2$ (vol-%) | 73.4 | 73.4 | 66.5 | 6.5 | 56.4 | 55.0 | 53.9 | 52.9 |
| $NH_3$ (vol-%) | 2.1 | 2.1 | 11.3 | 11.3 | 24.8 | 26.6 | 28.1 | 29.5 |

The data for beds (38) and (42) each belong to the exit from the bed. Due to the optimum temperature profile in this example, the very high $NH_3$ concentration of 29.5 vol-% is achieved at the reactor outlet (19).

The invention claimed is:

1. A process for producing ammonia comprising reacting a synthesis gas which contains nitrogen and hydrogen on a granular catalyst in at least one reactor at pressures in the range of 50 to 300 bar and temperatures in the range of 100 to 60° C., wherein a product mixture containing $NH_3$ vapor is removed from the reactor and cooled, whereupon ammonia condenses out and is separated, yielding a circulating gas to which fresh synthesis gas is added, and wherein the circulating gas is returned as synthesis gas back to the reactor, unreacted synthesis gas is passed through a first catalyst bed, which is free of cooling pipes, and then it is sent as a partially reacted synthesis gas having an NH₃ content of 5 to 20 vol % through a heat exchanger, where it functions as heating fluid, wherein partially reacted synthesis gas is passed through at least two additional catalyst beds, which have cooling pipes running through them; unreacted synthesis gas is passed as a cooling gas through the cooling pipes of the additional catalyst beds, and cooling gas heated to 300° C. to 500° C. is passed into the first catalyst bed; the gas flows through the cooling pipes and the additional catalyst beds in co-current, and the cooling gas is first passed through the cooling tubes of a last catalyst bed and then the cooling tubes of a next-to-last catalyst bed.

2. The process according to claim 1, wherein the heating fluid coming from the heat exchanger is sent from the reactor to a separate tubular reactor in which the catalyst is arranged in tubes through which a cooling fluid is circulated; partially reacted synthesis gas having an NH₃ content of 15 to 30 vol % and temperatures of 250 to 500° C. is removed from the tubular reactor and passed through a catalyst bed having cooling pipes.

3. The process according to claim 2, wherein the pressure on the outside of the tubes of the tubular reactor containing the catalyst is 30 to 290 bar lower than that in the interior of the tubes.

4. The process according to claim 1, wherein unreacted synthesis gas is passed as a coolant through heat exchangers in which the partially reacted synthesis gas serves as a heating fluid and then it is passed into the cooling tubes of a catalyst bed.

5. The process according to claim 2, wherein partially reacted synthesis gas having an NH₃ content of 5 to 15 vol % is sent into the separate tubular reactor.

6. The process according to claim 3, wherein partially reacted synthesis gas having an NH₃ content of 5 to 15 vol % is sent into the separate tubular reactor.

7. The process according to claim 4, wherein partially reacted synthesis gas having an NH₃ content of 5 to 15 vol % is sent into the separate tubular reactor.

* * * * *